Sept. 26, 1950 H. HANSEN 2,523,904

RECORD SENSING AND TRANSLATING DEVICE

Filed Oct. 11, 1946 4 Sheets-Sheet 1

INVENTOR
H. HANSEN
BY R. Marino
ATTORNEY

Sept. 26, 1950 H. HANSEN 2,523,904

RECORD SENSING AND TRANSLATING DEVICE

Filed Oct. 11, 1946 4 Sheets-Sheet 2

INVENTOR
H. HANSEN
BY R. Marino
ATTORNEY

Sept. 26, 1950 H. HANSEN 2,523,904

RECORD SENSING AND TRANSLATING DEVICE

Filed Oct. 11, 1946 4 Sheets-Sheet 3

INVENTOR
H. HANSEN
BY R. Marino
ATTORNEY

Sept. 26, 1950 H. HANSEN 2,523,904

RECORD SENSING AND TRANSLATING DEVICE

Filed Oct. 11, 1946 4 Sheets-Sheet 4

INVENTOR
H. HANSEN
BY R. Marino
ATTORNEY

Patented Sept. 26, 1950 2,523,904

UNITED STATES PATENT OFFICE 2,523,904

RECORD SENSING AND TRANSLATING DEVICE

Harry Hansen, Clifton, N. J., assignor to Bell Telephone Laboratories, Incorporated, New York, N. Y., a corporation of New York Application October 11, 1946, Serial No. 702,661

8 Claims. (Cl. 177—353)

This invention relates to sensing devices or "readers" for indicating and translating information recorded on a punched or embossed tape or strip.

The invention is particularly adapted for use in connection with records of telephone calls recorded by a tape perforator of the type disclosed in the copending application of W. W. Carpenter, Serial No. 588,401, filed April 14, 1945, but is also applicable to the reproduction and translation of information of any kind which has been recorded by punching, embossing, or otherwise mechanically impressing, a tape, strip or sheet.

In the present embodiment of the invention, a device is disclosed which consists essentially of a plurality of cam-operated sensing pins adapted to sense each line of the record tape successively, coacting with depressions in said tape to set, in combinations, groups of code bars, in accordance with the recorded information and to reset said code bars, through the intermediary of an electrical translating or computing device, in accordance with data computed from said information.

The construction and operation of the invention will be more clearly understood from the following description, the appended claims, and the attached drawings, in which:

Figure 1:
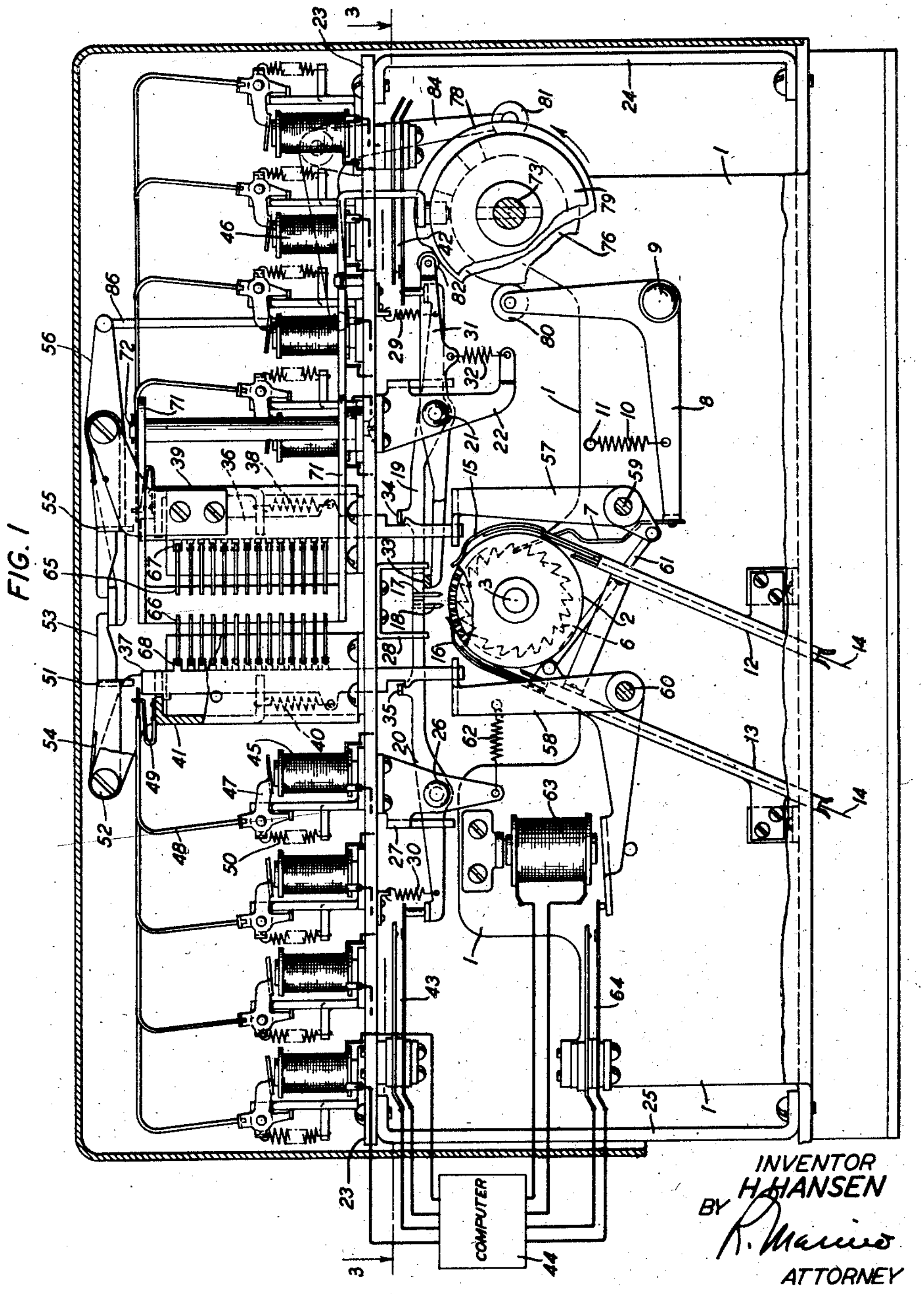
Fig. 1 shows a side elevation of the device, the cover being cut away to more clearly display the details in the mechanism.
Figure 2:
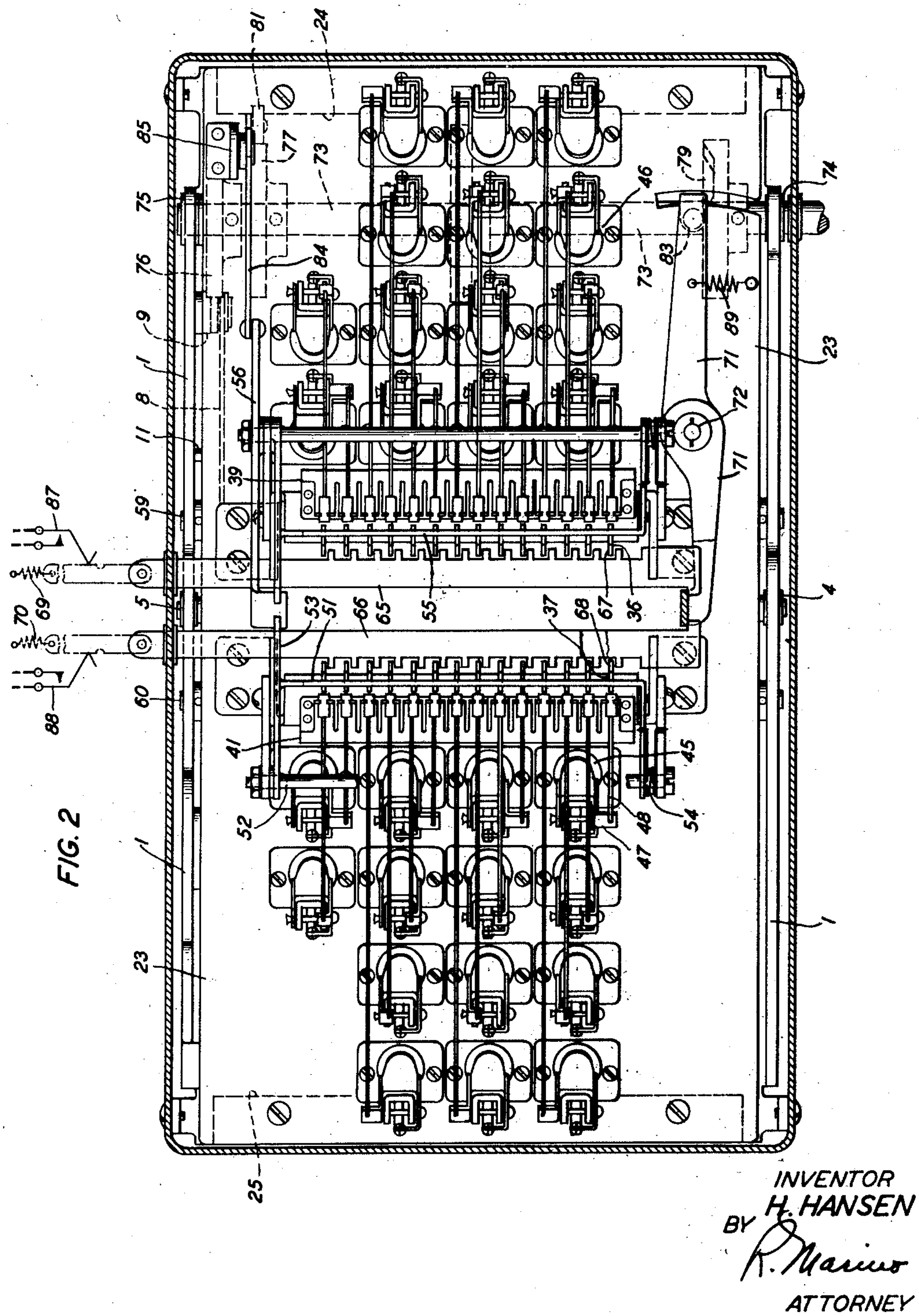
Fig. 2 is a plan view.

Referring now to the drawings in which identical numerals in the various figures indicate identical parts, the numeral 1 designates the framework which is formed to afford support to the working parts of the device. A perforated drum 2 for carrying the record tape is rigidly mounted on the shaft 3 which turns in bearing 4 and 5 in the framework 1. The ratchet 6, which is pinned to shaft 3, is engaged by a spring pawl 7 carried by one arm of the bent lever 8 pivoted on stud 9 fixed in framework 1. The spring 10, one end of which is attached to the arm of lever 8 and the other to a stud 11 fixed in framework 1, tends to lift the pawl 7 and so to turn ratchet 6 and thereby turn shaft 3 and drum 2.

Figure 3:
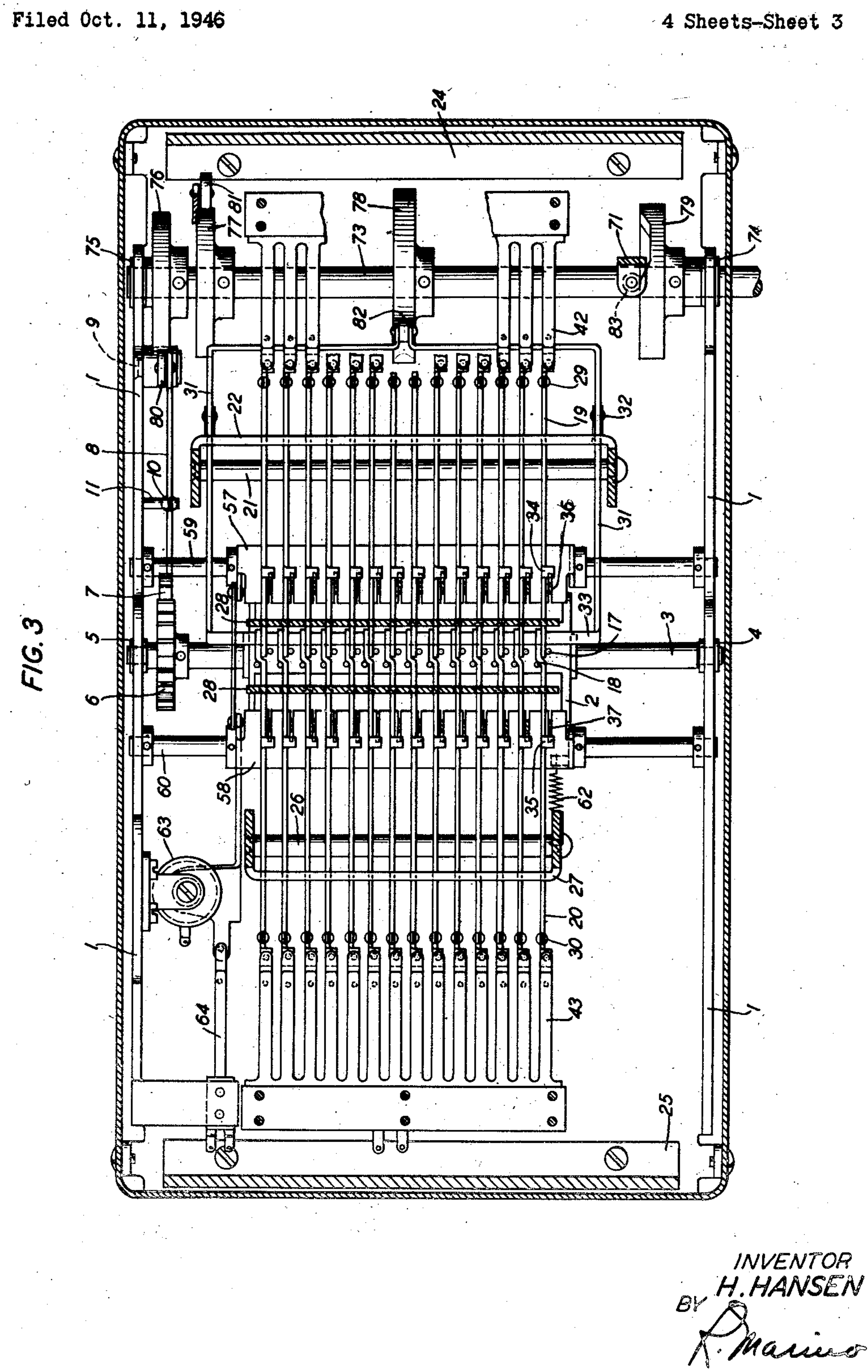
Fig. 3 is a horizontal section on the line A—A of Fig. 1.

Two guides 12 and 13 are mounted on framework 1 to carry the record tape 14 over drum 2, spring fingers 15 and 16, attached to said guides, holding said tape in close contact with said drum. Above drum 2 is arranged a series of sensing pins, of which pins 17 and 18 are two, each pin carried by a pivoted lever. Pin 17, for example, is attached to and carried by lever 19 pivoted on the rod 21 rigidly fixed in the bracket 22 fastened to the plate 23, which is supported on framework 1 by brackets 24 and 25. Pin 18 is similarly attached to and carried by lever 20 pivoted on rod 26 fixed in bracket 27 on plate 23. Although only two sensing pins 17 and 18 and their respective levers 19 and 20 appear in Fig. 1 and are shown, for the sake of clarity, in Fig. 4, it will be understood that a series of sensing pins and associated levers is provided, extending across the tape 14, one sensing pin being located at each position where a depression forming part of the record may appear in one line or row of said depressions in said tape. A full complement of sensing pins and their levers is shown in Fig. 3. When drum 2 is stationary, each sensing pin 17, 18 is in alignment with a perforation in said drum, the alignment being maintained by a guide 28.

In the present embodiment of the invention, twenty-eight (28) sensing pins and their levers are used, said pins being arranged in a staggered row across tape 14, which agrees with the arrangement of depressions in said tape, and the levers 19, 20 are arranged in two rows.

Springs 29, 30 are attached to the levers 19, 20 and to plate 23 and tend to depress the sensing pins 17, 18 onto tape 14. Said pins are, however, normally held clear of tape 14 by the rectangular bail 31 which is independently pivoted on rod 21. Under the influence of a spring 32 connected between said bail and an arm formed on bracket 22, the cross-piece 33 of said bail presses upward under the right-hand levers 19 and under the projecting ends of the left-hand levers 20. Each of the levers 19, 20 has a projection which engages a notch in a key capable of vertical motion. For example, lever 19 has a projection 34 engaging a notch in key 36 which is supported by spring 38 but may move downward in the guide 39, while lever 20 has a projection 35 engaging a notch in the key 37 supported by spring 40 and capable of vertical movement in guide 41. One key 36, 37 is, therefore, provided for each of the levers 19, 20, respectively.

The projections 34, 35 on the levers 19, 20 have sufficient play in the notches of the keys 36, 37 so that if any sensing pin 17, 18 is depressed until it touches the surface of tape 14, the associated key will not thereby be depressed. For example, if pin 17 is depressed until it touches the surface of tape 14, projection 34 may contact the edge of the notch in key 36 but will not depress said key. However, further depression of pin 17 causes projection 34 to depress key 36.

Electrical contacts 42, 43 are mounted on plate 23 in positions to be actuated by the heels of the levers 19, 20, one pair of said contacts being provided for each of said levers. Said contacts are also adjusted so that they are not closed by levers 19, 20 whose sensing pins 17, 18 contact the surface of tape 14 but are closed by levers whose sensing pins are further depressed by entering depressions in the tape. Said electrical contacts are connected to a translator or computing device 44, adapted to be actuated by closure of said contacts. Also connected to translator 44 are a series of magnets 45, 46 mounted on plate 23, one magnet being provided for each of the keys 36, 37. Said magnets are all similar in construction although, for convenience, they are mounted at varying distances from the keys with which they are associated. A description of one of said magnets, therefore, will serve for all.

Magnet 45, for example, has a pivoted armature 47 carrying a bent rod 48 projecting through a flexible guide 49 above the top of key 37. Said armature and, in consequence, said rod, is normally retracted by spring 50 so that the projecting end of said rod is not in the descending path of the bar 51. But if magnet 45 is energized, attracting armature 47, the movement of said armature is sufficient to project rod 48 through guide 49 into the path of bar 51. One end of bar 51 is bent and pivoted on rod 52 carried by guide 41. The other end of bar 51 is attached to lever 53, also pivoted on rod 52. Bar 51 is, therefore, so arranged that it may descend, under the action of the torsion spring 54, onto the tops of the left-hand keys 37. A similar bar 55 is similarly arranged over the tops of the right-hand keys 36. Both of said bars are normally supported by lever 56 which takes effect under lever 53 and under the similar lever of bar 55. Lever 56, has a movement described later, which permits bars 51 and 55 to descend, but not far enough to depress any of the keys 36, 37. If, however, rod 48 is projected, as described above, its projecting end will be depressed by bar 51 when said bar descends, both rod 48 and guide 49 being sufficiently flexible to permit such deflection. The projecting end of rod 48 is also thick enough so that if depressed by bar 51, it will, in turn, depress key 37.

The combs 57 and 58, pivoted respectively on rods 59 and 60 fixed in framework 1 and joined by link 61, are adapted to engage the lower ends of the keys 36, 37, but are normally held out of engagement with said keys by a spring 62 connected between comb 58 and bracket 27. A part of comb 58 forms the armature of magnet 63 mounted on framework 1. The movement of said armature, when attracted by said magnet, is sufficient to bring comb 58 into engagement with the left-hand keys 37 and, through link 61, comb 57 into engagement with the right-hand keys 36 and, further, to force the depending ends of said keys inward until the notches in said keys are clear of the projections 34, 35 on the levers 19, 20. The movement of said armature also closes electrical contacts 64, mounted in a suitable position on framework 1. Contacts 64 and the winding of magnet 63 are connected to the translator 44.

In the present embodiment of the invention, each of the keys 36, 37 has a projection which normally enters a notch in one of a series of horizontal code bars. For example, key 36 has a projection 67 entering a notch in code bar 65 while key 37 has a projection 68 entering a notch in code bar 66. The number of code bars 65, 66 is, therefore, equal to the number of keys 36, 37. But each key 36, 37 may have more than one projection entering notches in more than one code bar and the number of code bars may be greater than the number of keys. The keys 36, 37 are, therefore, also code bars but are described as keys to distinguish them from the code bars 65, 66. The code bars 65, 66 are capable of longitudinal movement in the guides 39 and 41 under the action of springs 69, 70, one of which is attached to each of said code bars, but all of said code bars are normally held out of engagement with the projections 67, 68 on the keys 36, 37 by the vertical portion of the double lever 71 pivoted on stud 72 fixed in plate 23, said vertical portion of lever 71 engaging the hook-shaped ends of the code bars 65, 66. The electrical contacts 87, 88 do not form part of the device but indicate a means whereby movement of code bars 65, 66 may be indicated to other devices.

The shaft 73 is rotatably mounted in bearings 74 and 75 in framework 1 and has four cams 76, 77, 78 and 79 rigidly mounted on it. Roller 80, carried by lever 8, rests on the periphery of cam 76, which has a depressed portion of its circumference. Roller 81 rests on the periphery of cam 77 and is carried by one arm of a bent lever 84 pivoted in a bracket 85 mounted on plate 23. The other arm of said lever is connected by link 86 to lever 56. Cam 77 also has a depressed portion of its circumference. The bail 31 carries a roller 82 resting on the periphery of cam 78, which has a portion of its circumference of larger radius than the remainder. Cam 79 is a face cam having a depressed portion on one face. Roller 83 is carried by an arm of the double lever 71 and is drawn against the acting face of cam 79 by the spring 89.

Figures 4, 5:
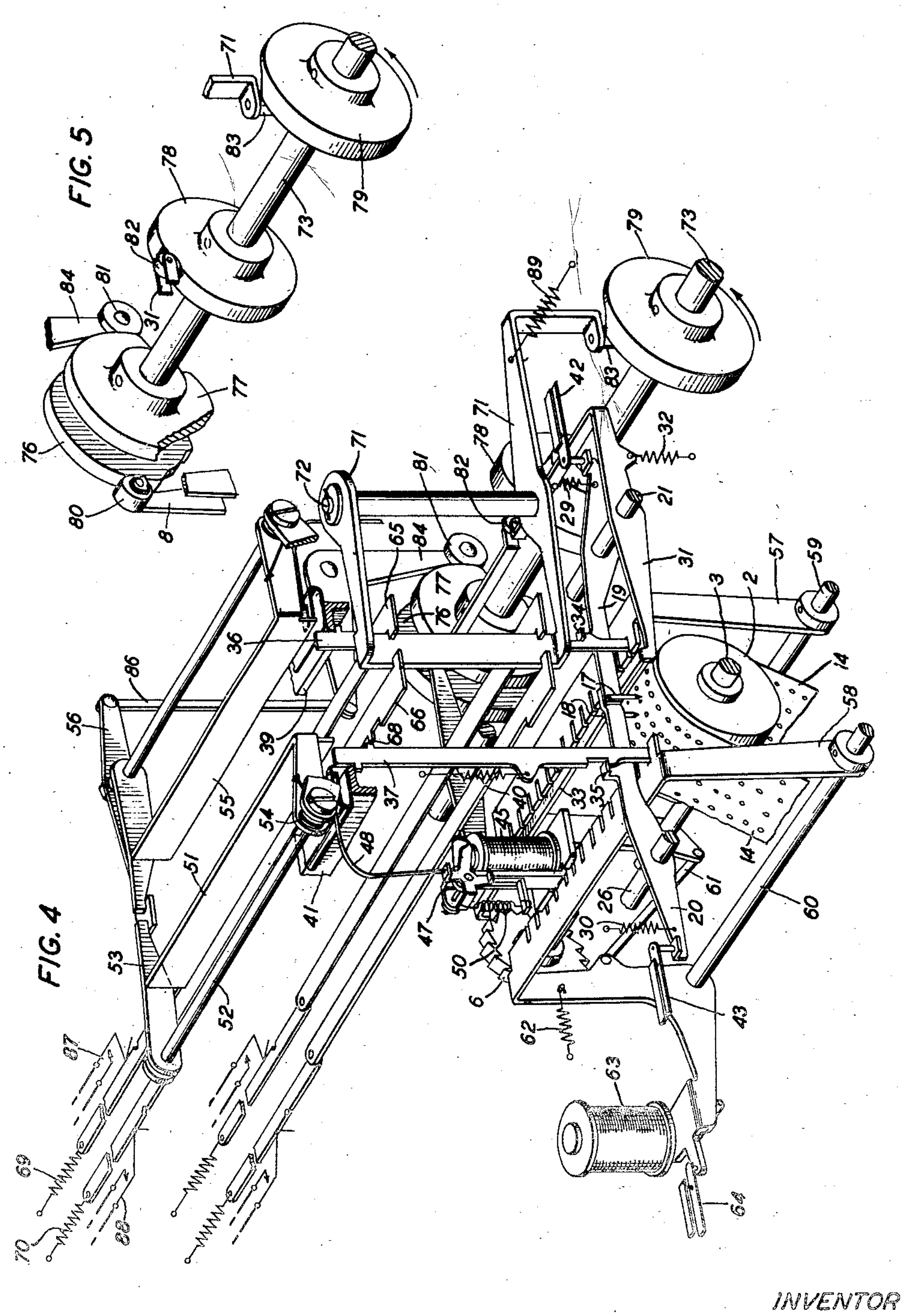
Fig. 4 is a perspective view of some of the principal parts of the mechanism which are more clearly shown by the omission of the supporting framework and other parts.
Fig. 5 shows the details of the cams and rollers.

The cams 76, 77, 78 and 79 are mounted on shaft 73 in such relation to the positions of the rollers 80, 81, 82 and 83 and the lengths of the depressed or raised portions of said cams are such that, upon rotation of shaft 73 in the direction indicated by the arrows in Figs. 4 and 5, roller 82 encounters the raised portion of cam 78, roller 81 encounters the depressed portion of cam 77, and roller 83 encounters the depressed portion of cam 79 in the order named. Then roller 83 encounters the normal portion of cam 79, roller 81 encounters the normal portion of cam 77, roller 82 encounters the normal portion of cam 78, and roller 80 encounters first the depressed portion and then the normal portion of cam 76, in the order named.

Having described the construction of the invention, I will now describe its mode of operation, assuming that the record tape 14 to be sensed has been placed in position in guides 12 and 13 and over drum 2 and adjusted so that depressions forming part of the record on said tape are in alignment with perforations in said drum.

When the device is in operation, shaft 73 is revolved at suitable speed, in the direction indicated by the arrows in Figs. 4 and 5, by any suitable external means (not shown). When the raised portion of cam 78 comes under roller 82, said roller is raised, depressing the crossbar 33 of the bail 31 thereby allowing the sensing pins 17, 18 to fall onto tape 14 under the action of the springs 29, 30. Each sensing pin which does not encounter a depression in tape 14 then merely rests upon the surface of said tape and its associated key is not depressed. But each sensing pin which encounters a depression in tape 14 falls far enough for its associated key to be depressed. For example, if pin 17 does not encounter a depression in tape 14, it is arrested by the surface of said tape and projection 34 on lever 19 does not then move far enough to depress key 36. But if pin 18 encounters a depression forming a part of the record on tape 14, said pin falls beyond the normal surface of said tape and the movement of projection 35 on lever 20 is sufficient to depress key 37, so that projection 68 on said key is disengaged from the notch in code bar 66. A combination of keys is, therefore, depressed which corresponds to the positions of the depressions by which information is recorded on one line of tape 14.

By the rotation of shaft 73, roller 81 now enters the depressed portion of cam 77 permitting the torsion springs 54 to depress bars 51 and 55, which, however, perform no useful function at this time.

Upon further rotation of shaft 73, roller 83 enters the depressed portion of cam 79 under the action of spring 89. Lever 71 is thereby revolved about stud 72 permitting the code bars 65, 66 to be moved longitudinally by their springs 69, 70. All of said code bars which are not freed by the depression of their associated keys are, however, immediately arrested. For example, if key 36 is not depressed, code bar 65 is arrested in its longitudinal movement by projection 67 on key 36. Code bars whose associated keys are depressed are not thus arrested. A combination of code bars 65, 66 is thus moved which corresponds to the combination of keys 36, 37 depressed. By suitable arrangement of the projections 67, 68 on the keys 36, 37, any desired combination of the code bars 65, 66 may be thus permitted to move when a particular combination of said keys is depressed. In any case, the combination of code bars moved is indicative of the combination of keys depressed and, therefore, of the information recorded on the line of the record tape 14 contacted by the sensing pins 17, 18. The displacement of the code bars 65, 66 may be utilized to give a visual, mechanical, or electrical indication of said information and to actuate other devices, for example, by the closure of a combination of the contacts 87, 88 arranged to be closed by displaced code bars.

The invention is also adapted to translation of the recorded information involving computation by a translator, computer, or similar device 44 indicated in Fig. 1. This is an electrical device which responds to the closure of input circuits in combinations by energizing a particular combination of output circuits for each combination of closed input circuits, thus translating information in code into the same information in another code or into other related information in the same or another code. Any suitable form of device of this kind, for example, the code translator disclosed in the Patent No. 2,369,474 issued to H. P. Luhn on February 13, 1945, may be employed in the present invention. The translator may respond each time a line of the record is sensed, or it may be arranged to be responsive to the closure of one or of a selected combination of the contacts 42, 43. Depressions may be included as part of the record of any lines of tape 14 which, when encountered by sensing pins 17, 18 will cause the closure of the selected contacts, thereby causing said translator to function in connection with said lines, but said translator will not function in connection with any line of tape 14 which does not contain the selected depression or combination of depressions.

When a line of record tape 14 is sensed and a depression or combination of depressions is encountered by the sensing pins 17, 18 which causes closure of the selected combination of the contacts 42, 43, a combination of the keys 36, 37 is depressed, as previously described, but, in addition, all of the contacts 42, 43 which are closed transmit to the translator 44, the information contained in the sensed line of the record. The translator 44 then energizes magnet 63 which frees all of the keys 36, 37 depressed from the projections 34, 35 which depressed them and allows said keys to return to their normal positions. Operation of magnet 63 also closes contacts 64, causing translator 44 to energize a combination of the magnets 45, 46 in accordance with the computation made by said translator from the information furnished to it by the contacts 42, 43. When bars 51 and 55 then descend, as previously described, the rods 48 which have been projected into the paths of said bars by the magnets 45, 46 operated, are depressed, in turn depressing their associated keys 36, 37. A combination of said keys is thereby depressed, permitting movement, when released by lever 71, of a corresponding combination of code bars 65, 66. The combination of code bars thus moved represents data computed by translator 44 from the record information on one line of tape 14 instead of, as in the first instance, a reproduction of said information.

Upon further rotation of shaft 73, roller 83 rises on the normal face of cam 79, actuating lever 71 which draws all of the code bars 65, 66 back to their normal positions. The raised portion of cam 78 passes from under roller 82, allowing spring 32 to raise the crossbar 33 of bail 31 and so lift the sensing pins 17, 18 clear of tape 14. Any of the contacts 42, 43 closed are thereby opened, causing translator 44 to release the operated magnets 45, 46. The bars 51 and 55 are raised by cam 77 acting through roller 81, lever 84, link 86, and lever 56, allowing all of the keys 36, 37 which were depressed to return to their normal positions under the action of their springs 38, 40. Roller 80 then enters the depressed portion of cam 76, allowing the spring 10 to pull upward the arm of lever 8 carrying pawl 7, rotating ratchet 6, and thereby drum 2, one step of said ratchet. Depressions in tape 14 being engaged in perforations in drum 2, said tape is carried with drum 2 and a new line of the record brought into position beneath the sensing pins 17, 18.

Upon further rotation of shaft 73, lever 8 is restored to its normal position by cam 76 and the crossbar 33 of bail 31 is lowered by cam 78, allowing the sensing pins 17, 18 to fall on the new line of the record and a repetition of the operations described above to occur in connection with said new line of the record. Continued rotation of shaft 73, therefore, causes the lines of the record on tape 14 to be read in succession, the resulting displacement of the code bars 65, 66, as each line is read, indicating as desired, either a reproduction of the information recorded on said line, or a translation of said information, as described.

What is claimed is:

1. In a record sensing and translating device, in combination, a record having data recorded by lines of impressions therein, means for sensing said lines in succession, keys displaceable in response to the sensing of each line of said record in a combination corresponding to the impressions in said line, code bars responsive to the displacement of said keys, a normally ineffective translating device comprising means operative to restore displaced keys and means for displacing a different combination thereof prior to the displacement of said code bars by said displaced keys, and means responsive to said sensing means sensing a predetermined arrangement of impressions in a line of said record for rendering said translating means effective to restore displaced keys and displace a different combination thereof.

2. In a record sensing and translating device, in combination, a record having data recorded by lines of impressions therein, means for advancing said record line by line, means for mechanically sensing the lines of said record, means for applying said sensingg means to said record at each line thereof, keys displaceable in response to the sensing of each line of said record in a combination corresponding to the impressions in said line, displaceable code bars, means for displacing combinations of said code bars corresponding to keys displaced, a normally ineffective translating means comprising an electrical computing device responsive to said sensing means, magnets responsive to said computing device for restoring displaced keys and selectively operating another combination thereof, movable bails for displacing said combination of keys, means responsive to said sensing means sensing a predetermined arrangement of impressions in a line of said record for rendering said translating means effective, means operated by said translating means for restoring displaced code bars, and means comprising a continuously rotating shaft and cams thereon for actuating said advancing means, said applying means, said displacing means, said movable bails, and said restoring means in a time sequence.

3. The combination with an impressed record to be sensed, of means for sensing said record, an electrical translating device responsive to said sensing means, keys selectively displaceable in response to said sensing means, means operable by said translating device when actuated by said sensing means for restoring said displaced keys, other means operable by said translating device when actuated by said sensing means for selectively displacing a different combination of said keys, and code bars responsive to the first selective displacement of said keys to indicate the significance of the record sensed or to the second selective displacement of said keys to indicate the translation of the record by said operated translating device.

4. In a record sensing device, the combination with an impressed record to be sensed, means for supporting and advancing said record, sensing pins positionally responsive to the impressions of said record, means for applying said sensing pins successively to successive portions of said record, electrical contacts responsive to those sensing pins which respond to the impressions of said record at each application thereof to said record, keys selectively displaceable in response to said sensing means, a translating device responsive to said contacts, means operable by said translating device when actuated by said sensing means for restoring said displaced keys, means actuated in response to each operation of said translating device for displacing a different combination of said keys, a plurality of code bars selectively displaced in accordance with each combination of keys displaced in response to the operation of said translating device, thereby to indicate a translation of the sensed portion of said record, and means for restoring said displaced keys and code bars between successive applications of said sensing pins to said record.

5. In a record sensing device, the combination with an impressed record to be sensed, of sensing pins positionally responsive to the impressions of said record, electrical contacts responsive to the relative positions of said sensing pins, an electrical translating device responsive to said contacts, a plurality of keys selectively responsive to said sensing pins, means operable by said translating device when actuated by said contacts for restoring said keys, other means operable by said translating device when actuated by said contacts for selectively displacing a different combination of keys, and a plurality of code bars selectively displaceable by each combination of keys to indicate the significance of said record by one combination if said translating device is not operated and a translation of said record by the other combination if said translating device is operated.

6. In a record sensing device, the combination with an impressed record to be sensed, of means for supporting, positioning and advancing said record, sensing pins positionally responsive to the impressions of said record, means for applying said sensing pins successively to successive portions of said record, electrical contacts responsive to the relative positions of said sensing pins at each application thereof to said record, a translating device responsive to said contacts, a plurality of keys selectively displaceable in response to said sensing pins sensing each portion of said record, means operable by said translating device when actuated by said contacts in response to the sensing of each portion of said record for restoring said keys, other means operable by said translating device when actuated by said contacts for selectively displacing a different combination of keys, a plurality of code bars displaceable by each combination of displaced keys, whereby the significance of successive portions of said record or the translation thereof is indicated by a combination of said keys, and means for restoring said displaced keys and code bars between successive applications of said sensing pins to said record.

7. A record translator comprising in combination, a record, sensing means responsive to said record, keys displaceable and selectively responsive to the operation of said sensing means, a translating device responsive to the operation of said sensing means, and means responsive to said translating device for resetting said displaced keys and for thereafter displacing said keys in a different combination.

8. A record translator comprising in combination, a record, sensing means responsive to said record, keys displaceable and selectively responsive to the operation of said sensing means, an electrical translating device responsive to the operation of said sensing means, and means responsive to said translating device for resetting said displaced keys and for thereafter displacing said keys in a different combination.

HARRY HANSEN.

REFERENCES CITED

The following references are of record in the file of this patent:

UNITED STATES PATENTS

| Number | Name | Date |
|---|---|---|
| 1,394,439 | Murray | Oct. 18, 1921 |
| 2,057,653 | Potts | Oct. 13, 1936 |
| 2,094,133 | Nelson | Sept. 28, 1937 |
| 2,267,936 | Marrison | Dec. 30, 1941 |
| 2,369,474 | Luhn | Feb. 13, 1945 |
| 2,375,383 | Potts | May 8, 1945 |